Figure 1:
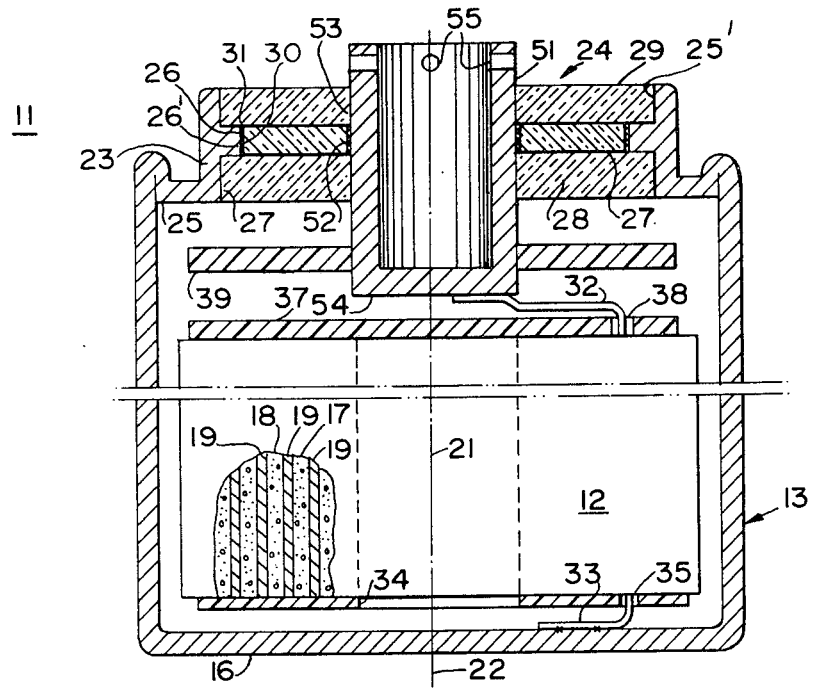

United States Patent [19]

Fairweather et al.

[11] 3,957,538
[45] May 18, 1976

[54] ALKALINE BATTERY SEAL

[75] Inventors: Michael J. Fairweather, Rossland; John A. Topping, Oakville, both of Canada

[73] Assignee: Her Majesty the Queen in right of Canada, as represented by the Minister of National Defence, Canada

[22] Filed: Feb. 24, 1975

[21] Appl. No.: 552,344

[30] Foreign Application Priority Data

Feb. 22, 1974 Canada .............................. 193272

[52] U.S. Cl. ............................... 136/133; 136/168
[51] Int. Cl.² .......................................... H01M 2/04
[58] Field of Search ............... 136/133, 83 R, 168, 136/169, 176, 175

[56] References Cited
UNITED STATES PATENTS

| 3,005,865 | 10/1961 | Jonsson | 136/168 |
| 3,416,964 | 12/1968 | Michalko | 136/133 |
| 3,421,945 | 1/1969 | Michalko | 136/133 |
| 3,881,955 | 5/1975 | Dubin et al. | 136/83 R |

Primary Examiner—Donald L. Walton
Attorney, Agent, or Firm—Stevens, Davis, Miller & Mosher

[57] ABSTRACT

A seal for a terminal member of a nickel-cadmium battery cell, provided with a, for example Ceramvar, terminal electrode which is first of all electroplated with nickel and is then electroplated with chromium. A ceramic ring is located between the terminal electrode and a shoulder portion of a steel collar in the battery, the shoulder portion having an axial length greater than the axial length of the ceramic ring and the ceramic ring being brazed to the central region of the shoulder portion. Glass rings, for example, which may be transparent, are provided on opposite sides of the ceramic ring and rest on ledges of the shoulder portion whereby a respective void is formed between the glass ring and the respective adjacent surface of the ceramic ring.

11 Claims, 2 Drawing Figures

U.S. Patent   May 18, 1976   3,957,538

ALKALINE BATTERY SEAL

This invention relates to rechargeable electric battery cells and, more particularly to hermetically sealed battery cells operating with an alkaline electrolyte.

Sealed rechargeable battery cells, such as nickel cadmium batteries, are well known to include at least one pair of porous, opposite polarity electrodes which are loaded with active electrode substances and are separated by a porous insulating layer. The electrode pores and the pores of the insulating layer are saturated with a corrosive alkaline electrolyte whilst in typical constructions the electrode assembly is mounted in a metal casing. Negative and positive electrodes are respectively connected to the casing and to a separate metallic terminal which is sealed in an insulating manner to a portion of the casing and is carried within said portion of the casing. As is well known, in some batteries both terminals are isolated from the case.

Difficulties have been encountered previously with such sealed cell designs due to leakage of the corrosive electrolyte through the insulating sealing joints, particularly under extreme environmental conditions. A general deterioration of the sealing joints as well as a loss of electrolyte results, which effectively destroys the practical utility of the cell. Such disadvantages have been particularly experienced in those cell designs in which the metallic material comprises a separate end row that is crimped and sealingly cramped under pressure over an end of the casing through an insulating gasket seal of plastic material.

Some improvement has been obtained by using the design described, e.g., in U.S. Pat. No. 3,064,065 (L. Belove — November, 1962). However, apparently the corrosive action of the electrolyte is inclined to attack the metalized coatings on the insulating column through the portions of the fusion joints exposed to the electrode assembly within the cell. Resultant corrosion generally leads to deterioration of the cell in a manner similar to that exhibited by the crimped-seal cell mentioned above. Proposals to overcome these disadvantages have been made, for example, in U.S. Pat. Nos. 3,416,964 Dec. 17, 1968 —Sonotone Corporation) and 3,421,945 Jan. 14, 1969 —Sonotone Corporation). The seal disclosed in U.S. Pat. No. 3,416,964 has sometimes been referred to as a triple seal in view of its construction or as a marathon triple seal.

It is an object of the present invention to provide an improvement in the triple seal disclosed in said U.S. Pat. No. 3,416,964.

One aspect of the present invention provides in a seal for an alkaline battery, the provision of a terminal electrode electroplated first with nickel and secondly with chromium, a steel collar spaced from and surrounding said terminal electrode and provided with an interior shoulder portion, a ceramic ring located between said terminal electrode and said shoulder portion and having an axial length less than the axial length of said shoulder portion, said ceramic ring being brazed to said shoulder portion in the central region thereof, a solid glass ring sealing member surrounding said terminal electrode and resting on a ledge of said shoulder portion whereby a void exists between the glass ring and the adjacent surface of the ceramic ring.

From another aspect the present invention provides in the manufacture of a seal for an alkaline battery a method including the steps of electroplating a terminal electrode with nickel, subsequently electroplating said terminal electrode with chromium, locating the terminal electrode in the alkaline battery with a steel collar spaced from and surrounding said terminal electrode, said steel collar having an interior shoulder portion, providing a ceramic ring between said terminal electrode and said shoulder portion and having an axial length less than the axial length of said shoulder portion, brazing said ceramic ring to said shoulder portion in the central region thereof, providing solid glass ring sealing members surrounding said terminal electrode and resting on the ledges of said shoulder portion, and wherein voids exist between said glass ring and the adjacent surfaces of the ceramic ring.

Figure 2:
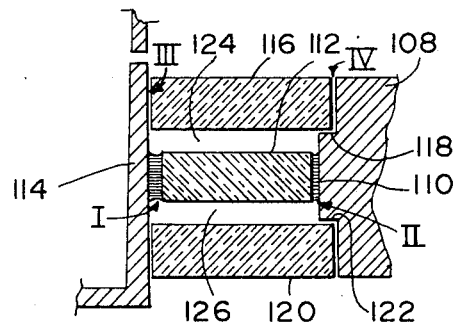

It will be appreciated that instead of chromium we may use other suitable materials The present invention will now be described, by way of example, with reference to the accompanying drawings in which:

FIG. 1 is a diagrammatic representation showing a sectional elevation of one form of a prior battery cell disclosed is U.S. Pat. No. 3,416,964, and FIG. 2 is a partly cross-sectional diagrammatic representation of a seal according to the present invention.

Referring now to the prior battery cell illustrated in FIG. 1, that battery cell is described in U.S. Pat. No. 3,416,964. For completeness sake, and a greater understanding of the instant invention, the descriptive portion from U.S. Pat. No. 3,416,964 will be reproduced below with reference to the prior art battery cell of FIG. 1.

The battery 11, of FIG. 1, illustratively comprises a nickel-cadmium cell operating with an alkaline electrolyte, and includes an electrode assembly 12 mounted within a metallic casing 13. The casing 13 is formed from a suitable alkali-resistant material, such as nickel coated, cold-rolled sheet steel of stainless steel, with the nickel coating applied before or after cell assembly. Casing 13 includes a tubular side wall 14 and an integral bottom wall 16. The electrode assembly 12 consists of at least one pair of superposed electrode plates 17 and 18 of opposite polarity separated by an electrically insulating separator sheet or layer 19. The electrodes 17 and 18 and the separator 19 are made porous for the purpose of absorbing and immobilizing the alkaline electrolyte within the electrode assembly 12. Although the battery cell 11 may operate with any known form of electrode assembly (for instance a stack of vertically superposed electrode plates of alternating polarity), the electrode assembly 12 is in the form of a spiral coil.

The spirally coiled electrodes 17 and 18 of the electrode assembly 12 are in the form of sintered plates, the pores of which are suitably loaded with active electrode substances, and may be of the general type described in U.S. Pat. No. 2,702,212 and in the article "Nickel Cadmium Battery Plates" published Dec. 6, 1948 in the Journal of the Electro-Chemical Society, vol. 94, No. 6, pp. 289–299. The active electrode substance for the positive electrode plate 17 consists of a first form of nickel hydroxide $Ni(OH)_2$ which, when fully charged, is converted into a second form of nickel hydroxide $NiO(OH)$ in which nickel is present in a higher oxidation state. The active electrode substance for the negative electrode plate 18 consists of cadmium hydroxide $Cd(OH)_2$ which, when fully charged, is converted into metallic cadmium. The electrolyte employed in cells of this type typically comprises a 20 to 30 percent (by weight) solution of potassium hydroxide in water.

The coiled electrode assembly 12 has a hollow central passage 21 and is designed to fit tightly within the space enclosed by the side wall 14 and the bottom wall 16 of the cell casing 13. The axis of the coiled electrode assembly 12 is generally coaxial with the axis 22 of the casing 13.

The casing 13 is also provided with an integral top wall or cover 23, fused or welded to the surrounding casing edge in the general manner fully discussed in above-referred U.S. Pat. No. 3,064,065. The metallic cover wall 23 has a centrally disposed circular aperture 24. The cover opening 24 is of a generally cylindrical configuration, including longitudinally adjacent cylindrical wall surfaces 27', 26 and 25', with intermediate wall surface 26 being at the end of inwardly extending shoulder 26'. Disposed within the aperture 24 in an elongated tubular metal terminal member 50 having a cylindrical wall surface 51 longitudinally coextensive with the wall surfaces 27', 26, 25' of the terminal opening and space separated therefrom to define a sealing region which accommodates the multi-seal assembly 27, 28, 29 of the instant invention. The terminal member 50 may typically be formed of a nickel-iron alloy containing 50% nickel and 50% iron, or a nickel-cobalt alloy, which is distributed under the trade name "Kovar". The terminal member which extends through aperture 24 in the top wall 23 to the interior of the cell 11 is shown having transverse apertures 55 about its circumference, which may typically receive circuit connecting means (not shown) such as wires, for connection of the cell terminal 50 to the external circuitry powered by the battery.

The positive and negative electrode plates 17 and 18 of the battery cell 11 are respectively connected to the insulated terminal member 50 and to the metallic casing 13. In the form shown, the positive electrode plate 17 is connected to the terminal member 50 by means of a first strip or tab 32 spot-welded to an inner wall surface 54 of the terminal member. Similarly, the negative electrodes plate 18 is connected to the casing 13 by means of a second strip or tab 33 spot-welded to the bottom wall 16 of the casing.

The tab 33 is insulated from the positive electrode 17 at the bottom end of the electrode assembly 12 by means of a first insulating sheet 34, through which tab 33 passes. Similarly, tab 32 is insulated from the negative electrode 18 at the top of the electrode assembly 12 by a second insulating sheet 37 containing an aperture 38 through which tab 32 passes. In addition, a third apertured nylon sheet 39, typically of split ring construction, is disposed around the inwardly projecting portion of terminal member wall surface 51, to insulate the tab 32 from the metalic top wall 23 of the casing 13.

A detailed consideration will now be directed to the multiple member sealing assembly which constitutes the subject matter of the invention described in U.S. Pat. No. 3,416,964. An intermediate length of the sealing region intermediate the wall surface of opening 24 and the wall surface 51 of terminal member 50 includes a primary seal formed of collar member 27. Collar member 27 is a longitudinal extend less than the longitudinal extent of the overall sealing region and equal to the length of the inwardly extending shoulder 26', collar member 27 includes insulatingly spaced juncture surfaces 30, 52 in justaposition with respect to inwardly stepped wall surface 26 of the aperture opening 24 and an intermediate region of the terminal wall surface 51. The collar 27 is formed from high density, liquid-and-gas-tight ceramic material.

In particular, the material of the collar 27 is designed to have high resistance to corrosion by the alkaline electrolyte of the cell 11. As an example, good results are obtained with the use of ceramic material consisting of high density, fired and matured ceramic solids containing 94 to 96 percent of alumina or aluminum oxide. Good results are also obtained with ceramic material consisting principally of zircon, a combination of zircon and aluminia, or of stearite of the type described in U.S. Pat. No. 2,912,340.

The outer circumferential surface 30 of ceramic collar 27 is metallically coated and joined by a first gas-tight metallic junction layer 31 to the longitudinally adjacent intermediate wall surface 26 of aperture 24 in the top wall 23. In like manner, the inner circumferential surface 52 of ceramic collar 27 is metallically coated and joined by a second gas-tight metallic junction layer 53 to the longitudinally adjacent region of the outer wall surface 51 of the terminal member 50. Any suitable process for forming fused metallic seals between a ceramic body and an adjacent metal body may be used in forming the junctions 31 and 53. For instance, in one process (known in the industry as the "Telefunken" process), a thin coating of fine metallic powder consisting of molybdenum with manganese is applied to the inner and outer circumferential juncture surfaces 30 and 52 of the ceramic collar 27. The metallic powder is held in a suitable coating medium such as nitrocellulose lacquer. The coated ceramic collar 27 is then heated for a half hour in a protective atmosphere of nitrogen wherein the applied molybdenum-manganese mixture forms homogeneous metallic strata on the surfaces 30 and 52.

Alternatively, in the so-called "Bondley" process, the metallized strata on the surfaces 30 and 52 is formed either with titanium hydride or with zirconium hydride. As an example, fine titanium hydride powder is first mixed with a suitable binder such as nitrocellulose lacquer, and is then applied as a thin coating to the inner and outer surfaces 30 and 52. The ceramic collar 27 is then heated to a temperature in the range of 1100°C. to 1300°C. under vacuum, whereupon the titanium hydride decomposes and its titanium content forms a metallic stratum on each of the surfaces 30 and 52.

The metallic surface strata deposited on the surfaces of the ceramic collar 27 by any of the above-mentioned processes are then respectively joined by a suitably brazing metal to the metallic periphery 26 of the aperture 24 and to the outer metallic surface 51 of the terminal member 50. The brazing composition employed may advantageously consist of a eutectic alloy of nickel and gold, or other suitable composition.

While the resulting metallic fused unctions 31 and 53 are generally liquid-tight as well as gas-tight, it has been found that the metallized strata on the surfaces 30, 52 of the ceramic collar 27 may be attacked and corroded by the alkaline electrolyte employed in the battery cell 11. This corrosion eventually destroys the fusion seals 31, 53 and thus the usefulness of the cell 11.

A pair of alkaline resistant glass fusion seals 28, 29 are then formed in the annular sealing regions at the opposed ends of ceramic collar 27, so as to provide the stacked assembly of sealing members 28, 27, 29; with the primary seal of collar 27 interposed between the glass seals 28, 29. Glass seal 28 is formed of a suitable material which will offer significantly more resistance to the corrosive effect of the alkaline electrolyte than the metallic fusion seals 31, 53; and hence will serve as a protective barrier against the corrosive deterioration of metal fusion surfaces, 31 52. Glass seal 29 may preferably be formed of the same material, so as to serve a backup function to prevent any small amount of electrolyte which might leak past seal members 28, 27 from leaving the cell.

Glass seals 28, 29 are preferably formed by fusing layers of pulverized or granulated gas-tight glass that are placed around the periphery of its annular recesses. It has been found that seals 28, 29 formed from borosilicate glass such as that distributed under the trade name "Corning 9010", or other alkali-resistant glass which has a melting temperature significantly below that of the fused metallic junctions 31, 53, provide adequate protection against alkaline corrosion without destroying the gas pressure-resistant properties of the primary fusion seals 31, 53. Advantageously, the pulverized glass layers 28, 29 are applied after the metallic fusion seals 31, 53 are formed, and the pulverized layers are then fused into alkali-resistant, liquid-tight seals at the opposed longitudinal ends of primary fusion seals 31, 53 in an oven (not shown) that is heated to a suitable temperature.

By providing a multiplicity of sealing layers intermediate the inner volume of the casing and the external portion of the cover, the structure of the instant invention advantageously limits any fissures which may initiate in one of the layers from spreading to an adjacent layer and hence destroying the seal. That is, should the cover portion 23 tend to be bowed outwardly by pressure build-up within the cell, glass seal member 29 will be placed in tensile stress and opposed glass seal member 28 in compressive stress. Inasmuch as such glass materials usually can withstand compressive stresses, better than tensile stresses, cracks may tend to develop in glass seal 29 under extreme conditions of deformation. If so, such cracks or fissures will be limited to that sealing member and will not impair the effectiveness of the successively adjacent primary seal 27 and glass seal protection barrier 28. Conversely, should a crack develop in glass seal 28 which is of a sufficient magnitude to permit electrolyte to pass therethrough and degrade the effectiveness of metal fusion surfaces 31, 53, the presence of glass seal 29 will prevent leakage of the electrolyte from the cell, thereby preserving its utility.

As mentioned above, the instant invention is an improvement over the prior art sealing assembly illustrated in the nickel-cadmium cell of FIG. 1.

The instant invention is particularly directed to providing a sealing assembly for a nickel-cadmium cell which is capable of use for aerospace applications in which it will be substantially unattended and is required to provide successful long term performance. It has been discovered that certain properties are desirable:

1. The seal must be sufficiently strong to be uneffected by the mechanical shock of launching and also to withstand the high oxygen pressure that may build up within the cell during overcharge. Specifically, the seal must be capable of holding an internal pressure of 300 p.s.i.
2. The electrical resistivity must be sufficiently high to avoid self discharge. The resistance across the seal must preferably be greater than $10^7$ ohms and should not deteriorate during the cell operating life time.
3. The seal should be leak tight with respect to oxygen, KOH and water. Specifically, the leakage rate through the seal should be less that $10^{-9}$ cc/He/sec.
4. The seal should be able to withstand thermal cycling between −20 to +50°C.
5. The seal corrosion resistance to the electrolyte (30%KOH) should be very high to ensure a long life.
6. The seal should be uneffected by subsequent welding operations to the electrode pin and the steel cover.

Previous seals have been designed but have been found to have poor heat resistance, low power dissipation, and lower mechanical strength than is desirable for aerospace operations. The seal described in U.S. Pat. No. 3,416,964 does offer advantages in providing the required mechanical strength but investigations have shown that use of a braze alloy to seal the collar member to the pin and the metal casing must be carefully controlled as too little or too much braze can be a disadvantage and result in fracture of the ceramic collar. If the cooling rate following the brazing step is too high this may give rise to undesired thermal stresses, as may also occur due to the different thermal expansion coefficients of the centre pin and the braze etc. There thus may well be an undesirable variation in the properties of manufactured seals from seal to seal.

According to the present invention, a solid glass-seal preform is used and, for example, is ultrasonically machined or drilled using a rotary diamond core drill. This procedure has been found to produce a transparent and bubble-free glass.

Furthermore, when a Ceramvar* pin is used, the Ceramvar* pin is first of all electroplated with nickel and is then electroplated wtih chromium. The plated Ceramvar* pin is then fired to give a strongly adherent chrome-rich surface layer, which has equalibrium sealing conditions similar to the glass-to-metal stainless steel surfaces.

*Ceramvar is a Trademark for an iron,nickel, cobalt alloy designed and suited for ceramic-to-metal sealing.

It will be appreciated that instead of Ceramvar*, the pin could include any suitable alloy specially designed for glass-ceramic-metal sealing.

Experiment has shown that a Ceramvar*-glass interface is the critical area where seal failure occurs due to chemical attack of the KOH electrolyte. The plated Ceramvar*-glass interface apparently provides significantly improved chemical durability and the technique has proved experimentally successful. It will be appreciated that satisfactorily optimized conditions should be provided for plating and for bright firing so as to obtain good chronium-rich surface coatings.

It has furthermore been found advantageous according to the present invention to provide an interfacial void between the glass and ceramic components of the seal. This procedure will be explained in greater detail with reference to FIG. 2 from which it will be seen that the outside stainless steel (304L) collar 108 is machined so that it has an internal shoulder portion 110 which is wider than the ceramic (96% $Al_2O_3$) ring 112 which is located at the centre of the shoulder 110 and lies between said shoulder and the hollow Ceramvar* pin 114. A first glass (Corning 0088) seal preform 116 rests on one end ledge 118 of the shoulder portion 110 whilst a second glass preform 120 rests on the other ledge 122 of the shoulder portion 110. Thus the shoulder portion 110 serves to separate the glass seal preforms 116 and 120 from the surfaces of the ceramic seal ring 112 whereby voids 124 and 126 are formed therebetween.

The ceramic ring 112 is brazed in the centre of the shoulder portion 110 and when the glass seals 116 and 120 are fused, said voids 124 and 126 are between the glass seal members 116 and 120 and the ceramic ring member 112. As will be appreciated, a reliable seal is produced wherein the differential thermal contraction stress between the glass and ceramic component of the seal is eliminated.

Further details of some of the steps involved in producing a seal according to the present invention will be given below with greater practical information.

A stainless steel centre pin electrode could be used in a nickel cadmium cell but special techniques have to be used. Accordingly Ceramvar* centre pins are sometimes preferred and are electroplated with a thin coating of chrome or nickel and chrome prior to the glass-to-metal sealing step. The pins were plated using either a conventional acid chrome plating bath or a sodium tetrachromate plating solution and the thickness of the chromium plating was determined from the weight gain where prior nickel plating was used, a conventional Watts bath was used. Details of the plating procedure are as follows:

NICKEL PLATING

Watts Bath:
| | |
|---|---|
| Nickel sulphate | 44 oz/gal |
| Nickel chloride | 6 oz/gal |
| Boric acid | 5 oz/gal |
| pH | 1.5 – 4.5 |
| Temp. | 115 – 140°F |
| Current density | 20 – 100 A/ft$^2$ |
| Graphite anodes | |

CHROMIUM PLATING

Acid Chrome Solution:
| | |
|---|---|
| CrO$_3$ | 20 – 26 oz/gal (chrome acid) |
| SO$_4$ | 0.16 – .20 oz/gal (H$_2$SO$_4$) |
| Fl$^-$ | 0.10 oz/gal (KF) |
| Temp. | 110 – 130°F |
| Current density | 1.5 – 3.0 A/in$^2$ |
| Lead Anodes | |

Sodium Tetrachromate Solution:
| | |
|---|---|
| CrO$_3$ | 53 oz/gal |
| NaOH | 7.7 oz/gal |
| Cr$_2$O$_3$ | 1.0 oz/gal |
| H$_2$SO$_4$ | 0.1 oz/gal |
| Temp. | 70°F |
| Current density | 200 A/ft$^2$ |
| Lead Anodes | |

The glass seals were made either in graphite moulds or in machinable ceramic (AREMCO 1100) moulds using a graphite spacing ring to keep the glass from sticking to the ceramic. An evacuable tube furnace was employed and a ceramic push rod, used to propel the mould through the furnace, contained a thermal couple which indicated the sample temperature.

The sealing atmosphere was established by passing a stream of H$_2$/N$_2$ + Argon gas with a total flow rate of approximately 250 cc/min through a Fisher-Milligan water saturator maintained at 25°C. The H$_2$/H$_2$O ratio of the sealing atmosphere was calculated assuming complete saturation of the gas with water. The conditions were maintained constant apart from the relative ratios of H$_2$/N$_2$ gas to Argon. The seals were examined after fusion to determine if any cracks were present and to ensure uniform bonding. A contact wire was then soldered onto the pin and then each seal was placed in a seal test chamber.

The chamber was partially filled with 30% KOH and maintained under an internal pressure of 15 psi oxygen. The chamber was intermittently rocked to give the seal surfaces periodic contact with the KOH solution. The chamber itself was partially immersed in an oil bath maintained at 40°C. Two 1.5 volt dry cells were used to apply a positive and negative 1.5 volt bias to the seal pins.

The seals were periodically removed from the test facility and examined, seal failure being detemined by:
a. the presence of corrosion reaction product on the exterior (upper) seal surface indicating penetration of KOH,
b. dye penetrant transfer through seal.

The dye penetrant method could be used to readily guage the depth of attack in a partially corroded seal by optically estimating the penetration of the red dye penetrant liquid within the transparent seal.
c. Gross cracking of the seal.

Sample seals were sectioned using a Buhler Isomet low speed diamond saw for further examination of the seal structures following testing. It is of interest to record that simple chrome plating, for example to solid Ceramvar* pins showed great durability to KOH attack.

Bonding or Brazing Technique:

Referring to FIG. 3 it will be seen that four different bonding interfaces in the seal have been identified.
I. Alumina ceramic to 304L stainless steel.
II. Alumina ceramic to Ceramvar.
III. 0088 glass to 304L stainless steel.
IV. 0088 glass to Ceramvar.

The two ceramic metal braze bonds are carried out simultaneously in a dry hydrogen atmosphere.

The glass-to-metal seals on either side of the alumina seal are made sequentially under similar conditions using a wet hydrogen atmosphere.

It is preferable to make the upper glass-to-metal seal first and the lower seal which is exposed to the KOH electrolyte last.

The characteristics of these four seals will be discussed in turn regarding present understanding.

Seal I — 304L Stainless Steel to Alumina

Present Status

In all ceramic-to-metal sealing applications, the ceramic must be metallized. The moly-manganese process has been used previously — moly-manganese metallization is carried out by applying an 80–20 (wt%) mixture of -325 mesh molybdenum and manganese metal powders in the form of a slurry to the ceramic surfaces to be metallized. This coating is dried and fired to approximately 1475°C in a wet hydrogen atmosphere. The manganese oxidizes to form a manganese aluminosilicate glass by combining with alumina and silica from the ceramic. This glass bonds the molybdenum metal particles to the alumina surface. This process is applied by the ceramic component supplier (American Lava Corporation). The metallization mixture is applied either by brush or by solution metallizing. Both techniques work equally well on the outside diameter surface.

The metallized ceramics are electroplated with nickel and gold using a conventional Watts plating bath and an Engelhard proprietary gold plating solution, respectively. No correlation between sealing behaviour and the electroplate was observed.

The plated ceramic ring is sealed to the metal components using pure gold as a braze. Gold wire preforms are used. The sealing is carried out by firing the assembled components in a graphite or machined ceramic brazing fixture to 1060°C under 60%$H_2$–40%$N_2$ atmosphere. The gas is dried by passing it through a Type 4A grade 513 molecular sieve column maintained at approximately 60°C.

It is observed that the gold wire braze preform does not readily wet the stainless steel collar. This is due to the ready formation of a film of oxide on the stainless steel. The procedure adopted experimentally to overcome this problem is to carry out a chemical cleaning of the steel by soaking in the dry $H_2/N_2$ sealing atmosphere for 30 to 60 minutes between 950° and 1000°C prior to brazing.

Other alternative procedures are available:
1. Bright fire stainless steel components prior to the brazing step.
2. Carry out the brazing in a more hydrogen-rich atmosphere (a 60$H_2$/40$N_2$ gas is presently used).
3. Nickel plate the collar components prior to brazing.

A combination of steps 1 and 2 is considered advantageous.

Seal II — Ceramvar*-to-alumina

Present Status

Fabrication studies indicate that it is important to understand some of the following aspects to achieve good results according to the present invention:
1. Thermal Expansion Differential
2. Stress Transfer through Ceramic
3. Failure Mode of Ceramvar*-Alumina Bond
4. Radius of Curvature Effects
5. Variations between metallizing Procedures
6. Gold Solution in Ceramvar*
7. Mould Design
8. Pin Tolerance
9. Ceramvar*-Alumina Bonding Behaviour

Seal III — 304L Stainless Steel-to-Glass

The sealing of the glass to the stainless steel must be carried out under a precise oxygen partial pressure. The atmosphere control must be sufficient to obtain a good chemical bond while avoiding interfacial bubble formation. The conditions under which this is achieved are will understood — see above.

Seal IV — Ceramvar*-to-Glass

The plated seals generally showed improved resistance to the KOH attack, an advantage of the Cr plating is that the optimum sealing conditions for both seal III and seal IV are now identical and good seals are formed when the procedure described previously is followed.

Interfacial bubbles are found to occur at glass-to-metal seal interfaces which can be controlled by controlling the sealing atmosphere.

Interfacial bubbles are highly undesirable in the glass-to-metal seals as they will significantly limit the chemical corrosion resistance of the seal interface.

In practical experiments, leading to the present invention, the conditions for making a triple seal were determined. It would appear that a triple radial, compression seal requires three high temperature sealing operations. The first is a high temperature braze step for which the required sealing conditions are quite critical. The second and third steps are identical glass-to-metal sealing operations.

1. Ceramic-to-Metal Sealing Procedure

Example One

Components:
  304L stainless steel pin
  AlSiMag 614 96% $Al_2O_3$ ring metallized with $MoO_3$—MnO—$Al_2O_3$ $SiO_2$ metallization fired at 1350°C for 1 hour
  Ceramic ring plated with 0.0005" Ni, 0.0005" Au
  304L stainless steel collar
  Pin-Ring I.D. Separation 0.003"
  Collar-Ring O.D. separation 0.002"
  Gold ring braze preforms I.D. 0.012", O.D. 0.020"
Braze Fixture — Original design (Graphite)
Firing 2 hours 1000°C–1040°C
  3 minutes 1058°C–1060°C
  45 minute cool to 1000°C
Atmosphere —40%$H_2$—60%$N_2$ dried using a type 4A grade 513 molecular sieve column maintained at approximately 60°C.

Example Two

Components:
  Ceramvar*pin
  AlSiMag 614 96% $Al_2O_3$ ring metallized at American Lava using hand painting technique.
  Plated: 0.001" Ni, 0.0005" Au
  304L stainless steel collar
  Pin-Ring spacing 0.001" on the diameters of the components
  Ring-Collar spacing 0.001" on the diameters of the components.
  Gold Ring preforms 0.012"I.D., 0.1020"O.D.
Braze Fixture — New Design (Graphite)
Firing — 2 hours 980°C to 1035°C
  20 mins 1035 to 1055°C
  2 mins 1059 to 1060°C
  Rapid cooling
Atmosphere as for example one but a 60% $H_2$–40%$N_2$ gas was used.

Example three

Components:
  As for example two except for:
  Pin-Ring spacing 0.005"
  Ring Collar spacing 0.001" on the diameters
Firing:
  1¾ hours heating from 970°C to 1055°C
  5 mins heating 1055°C to 1058°C
  one min to 1062°C
Atmosphere: as for example two Recommended Brazing Procedure:
1. The "new design" braze fixture should be used with a pin-braze fixture separation at the brazing temperature of less than or equal to 0.001".
2. The Pin to Ceramic ring separation should be not more than 0.001".
3. The peak sealing temperature should be 1058°C±2°C for 1 to 2 minutes.
4. As noted, it is highly desirable to avoid the long chemical cleaning procedure as presently required by the stainless steel-alumina seal.
5. A dry hydrogen-nitrogen atmosphere is required. In the present work a 60%$H_2$–40%$N_2$ gas mixture has been preferably used. A higher hydrogen content (e.g. 75%$H_2$25%$N_2$) recommended. In the present work, the gas was dried by passing it through a Type 4A grade 513 molecular sieve column maintained at approximately 60°C.

A covered machineable ceramic (Aremco 1100) or graphite brazing fixture is used. This is thermally cycled as rapidly as the fixture can withstand due to thermal shock.

Glass-to-Metal sealing procedure

The following prodecures are pertinent when using ultrasonically machined glass preforms of Corning code 0088 composition. Other glasses would be expected to have differing sealing condition requirements. Corning code 0088 glass has been used in the present study.

Atmosphere: $H_2/H_2O$ ratio of 2 to 3.5. A wider variation may be permissible, but has not been investigated.

Temperature: 930°C±10°C

Time: Time at temperature 1 to 5 minutes.

These conditions have been investigated and found to give good seals; a wider variation may also be satisfactory.

In the above description reference has been made to a nickel-cadmium battery. It will be appreciated that the invention is not restricted thereto but is equally applicable to other types of alkaline batteries. The cells may be of any convenient concentric configuration.

What we claim:

1. In a seal for an alkaline battery, the provision of:
   i. a terminal electrode electroplated first with nickel and secondly with chromium,
   ii. a steel collar spaced from and surrounding said terminal electrode and provided with an interior shoulder portion,
   iii. a ceramic ring located between said terminal electrode and said shoulder portion and having an axial length less than the axial length of said shoulder portion, said ceramic ring being brazed to said shoulder portion in the central region thereof,
   iv. a solid glass ring sealing member surrounding said terminal electrode and resting on a ledge of said shoulder portion whereby a void exists between the glass ring and the adjacent surface of the ceramic ring.

2. In a seal according to claim 1, wherein said shoulder portion protrudes inwards towards said terminal electrode and is of rectangular cross-section so as to provide said first-mentioned ledge and a second ledge axially-spaced therefrom,
   said first-mentioned solid glass ring sealing member resting on said first-mentioned ledge,
   a second solid glass ring sealing member resting on said second ledge on the opposite side of said ceramic ring to said first-mentioned solid glass ring sealing member, and voids between the glass rings and the respective adjacent surface of the ceramic ring.

3. In a seal for an alkaline battery, the provision of:
   i. a terminal electrode electroplated first with nickel and secondly with chromium,
   ii. a steel collar spaced from and surrounding said terminal electrode and provided with an interior shoulder portion.
   iii. a ceramic ring, located between said terminal electrode and said shoulder portion and having an axial length less than the axial length of said shoulder portion, said ceramic ring being brazed to said shoulder portion in the central region thereof,
   iv. a solid glass ring sealing member surrounding said terminal electrode and resting on a ledge of said shoulder portion whereby on heat treatment of the solid glass ring sealing member it is sealed to the steel collar and the terminal electrode a void exists between the glass ring and the adjacent surfaces of the ring.

4. A seal according to claim 3 in which said terminal electrode is made of an iron, nickel, cobalt alloy.

5. In a seal according to claim 3 wherein said shoulder portion protrudes inwards towards said terminal electrode and is of rectangular cross-section so as to provide said first-mentioned ledge and a second ledge axially-spaced therefrom,
   said first-mentioned solid glass ring sealing member resting on said first-mentioned ledge,
   a second solid glass ring sealing member resting on said second ledge on the opposite side of said ceramic ring to said first-mentioned solid glass ring sealing member, and voids between the glass rings and the respective adjacent surface of the ceramic ring.

6. In a seal according to claim 4 wherein said shoulder portion protrudes inwards towards said terminal electrode and is of rectangular cross-section so as to provide said first-mentioned ledge and a second ledge axially-spaced therefrom,
   said first-mentioned solid glass ring sealing member resting on said first-mentioned ledge,
   a second solid glass ring sealing member resting on said second ledge on the opposite side of said ceramic ring to said first-mentioned solid glass ring sealing member, and voids between the glass rings and the respective adjacent surface of the ceramic ring.

7. In the manufacture of a seal for an alkaline battery a method including the steps of:
   i. electroplating a terminal electrode with nickel,
   ii. subsequently electroplating said terminal electrode with chromium,
   iii. locating the terminal electrode in the alkaline battery with a steel collar spaced from and surrounding said terminal electrode, said steel collar having an interior shoulder portion,
   iv. providing a ceramic ring between said terminal electrode and said shoulder portion and having an axial length less than the axial length of said shoulder portion,
   v. brazing said ceramic ring to said shoulder portion in the central region thereof,
   vi. providing solid glass ring sealing members surrounding said terminal electrode and resting on the ledges of said shoulder portion, and
   vii. wherein voids exist between said glass rings and the adjacent surfaces of the ceramic ring.

8. In the manufacture of a seal for an alkaline battery a method including the steps of:
   i. electroplating a terminal electrode with nickel,
   ii. subsequently electroplating said terminal electrode with chromium,
   iii. locating the terminal electrode in the alkaline battery with a steel collar spaced from and surrounding said terminal electrode, said steel collar having an interior shoulder portion,
   iv. providing a ceramic ring between said terminal electrode and said shoulder portion and having an axial length less than the axial length of said shoulder portion,
v. brazing said ceramic ring to said shoulder portion in the central region thereof,
vi. providing solid glass ring sealing members surrounding said terminal electrode and resting on the ledges of said shoulder portion, and
vii. heat treating said solid glass ring sealing member to first seal it to the steel collar and the terminal electrode, and
viii. wherein voids exist between said glass rings and the adjacent surfaces of the ceramic ring.

9. A method according to claim 8 wherein said terminal electrode is formed of an iron, nickel, cobalt alloy.

10. In a method according to claim 8 including the steps of:
i. providing said shoulder portion protruding inwards towards said terminal electrode and of rectangular cross-section so as to provide said first-mentioned ledge and a second ledge axially-spaced therefrom,
ii. said first-mentioned solid glass ring sealing member resting on said first-mentioned ledge,
iii. providing a second solid glass ring sealing member resting on said second ledge on the opposite side of said ceramic ring to said first-mentioned solid glass ring sealing member, and
iv. wherein further voids exist between the glass rings and the respective adjacent surfaces of the ceramic ring.

11. In a method according to claim 9 including the steps of:
i. providing said shoulder portion protruding inwards towards said terminal electrode and of rectangular cross-section so as to provide said first-mentioned ledge and a second ledge axially-spaced therefrom,
ii. said first-mentioned solid glass ring sealing member resting on said first-mentioned ledge,
iii. providng a second solid glass ring sealing member resting on said second ledge on the opposite side of said ceramic ring to said first-mentioned solid glass ring sealing member, and
iv. wherein further voids exist between the glass rings and the respective adjacent surfaces of the ceramic ring.

\* \* \* \* \*